Dec. 17, 1957　　　　M. E. FRY ET AL　　　　2,816,998
DOMESTIC APPLIANCE
Filed Feb. 2, 1954　　　　　　　　　　　　3 Sheets-Sheet 1
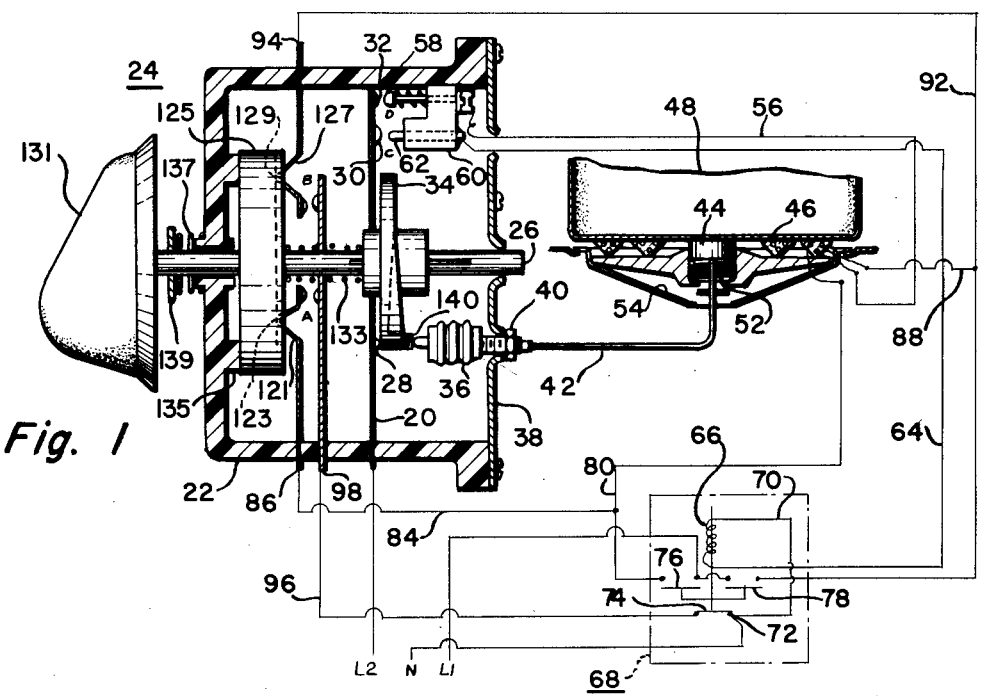
INVENTOR.
Millard E. Fry
Francis H. McCormick
BY
His Attorney Dec. 17, 1957 M. E. FRY ET AL 2,816,998
DOMESTIC APPLIANCE
Filed Feb. 2, 1954 3 Sheets-Sheet 2
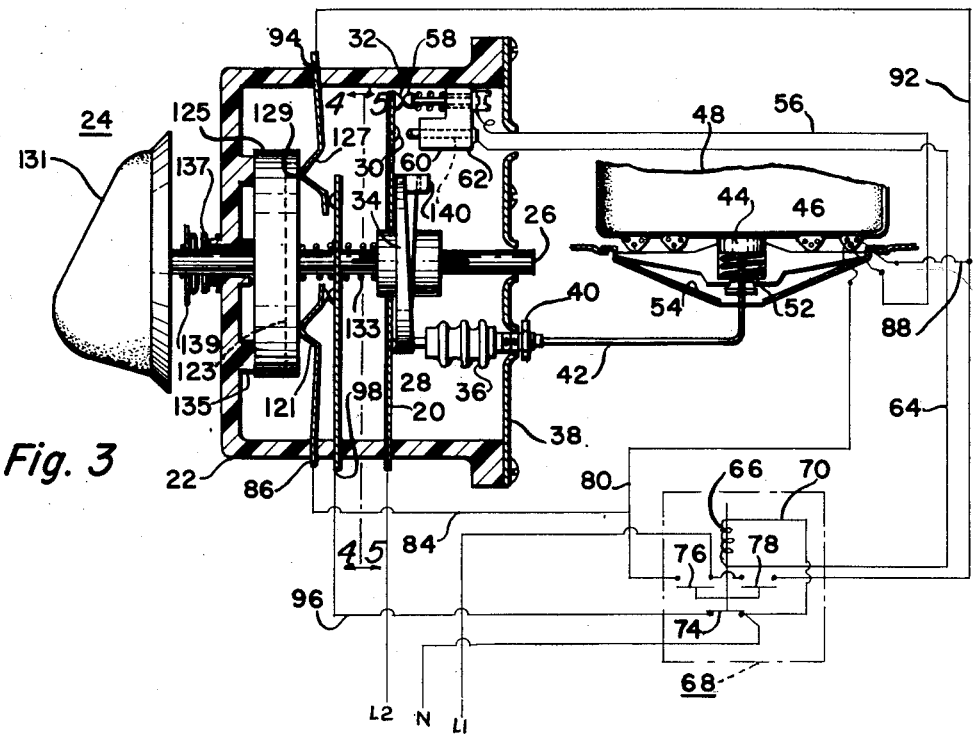
Fig. 3
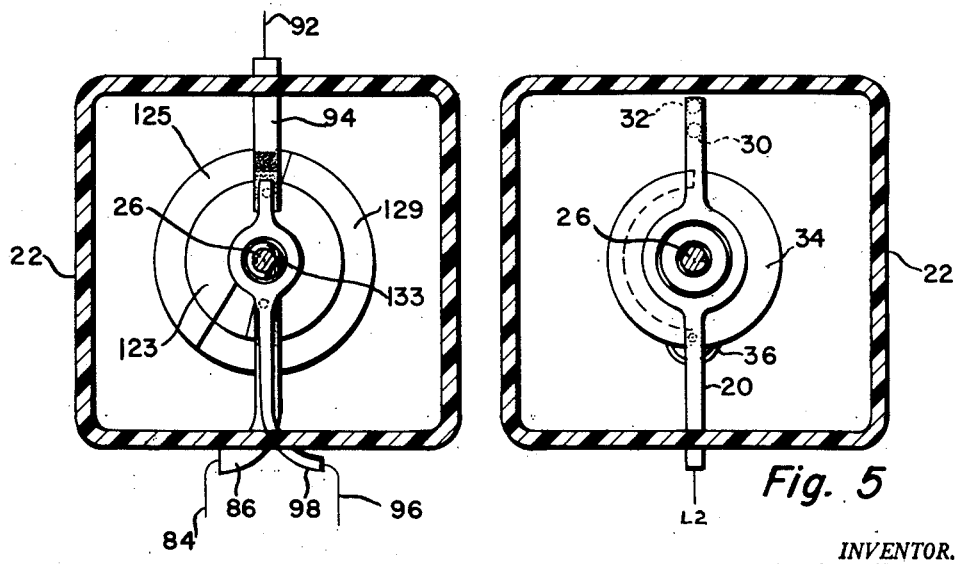
Fig. 4
Fig. 5
INVENTOR.
Millard E. Fry
BY Francis H. McCormick
His Attorney Dec. 17, 1957 M. E. FRY ET AL 2,816,998
DOMESTIC APPLIANCE
Filed Feb. 2, 1954 3 Sheets-Sheet 3
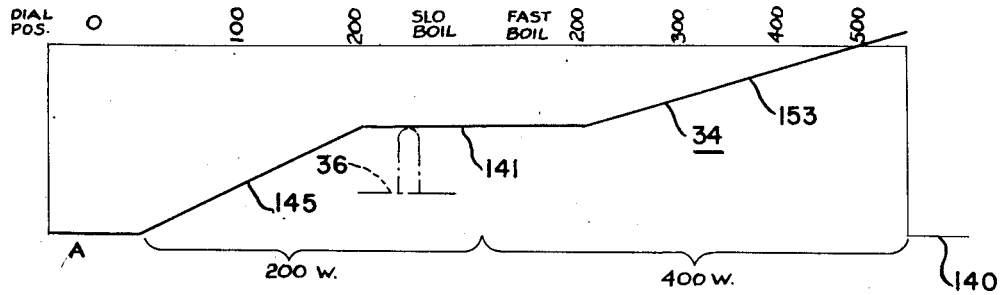
Fig. 6
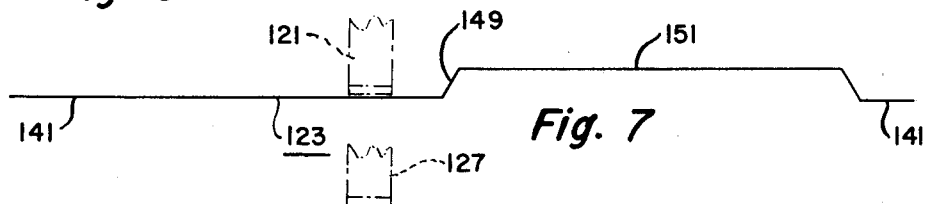
Fig. 7
Fig. 8
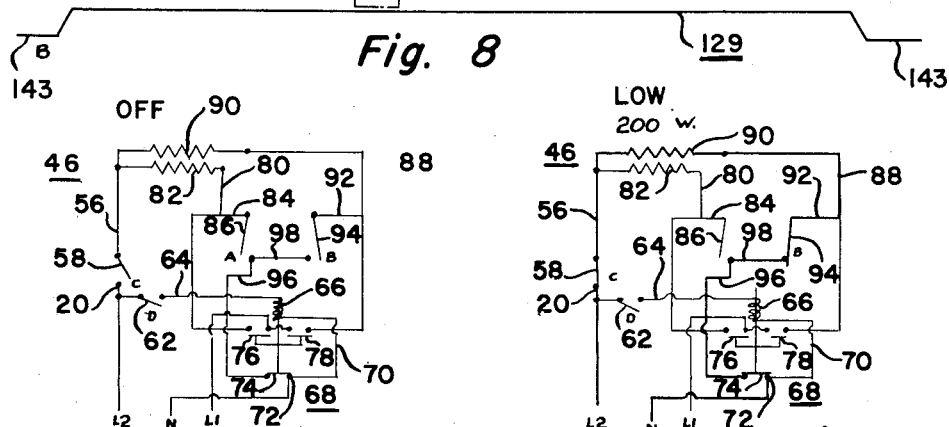
Fig. 9
Fig. 11
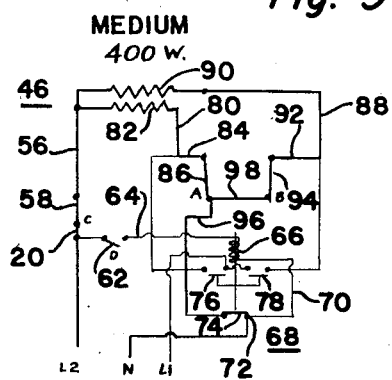
Fig. 12
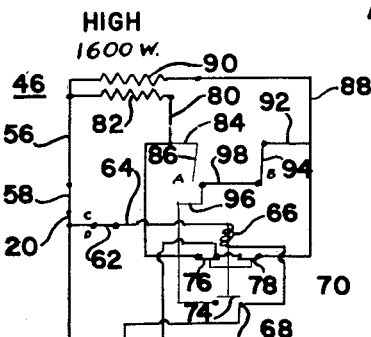
Fig. 10
INVENTOR.
Millard E. Fry
BY Francis H. McCormick
R. K. Candor
His Attorney

2,816,998
DOMESTIC APPLIANCE

Millard E. Fry and Francis H. McCormick, Dayton, Ohio, assignors to General Motors Corporation, Detroit, Mich., a corporation of Delaware Application February 2, 1954, Serial No. 407,642

6 Claims. (Cl. 219—20)

This invention relates to a domestic appliance and more particularly to an improved thermostatic control of the surface heaters of domestic electric ranges.

A wide variety of food preparation is performed on the surface heaters of domestic ranges. This includes warming, simmering, boiling, low temperature frying and French or deep fat frying. These operations are normally performed by first heating the vessel at the maximum heating input; then, to prevent overheating, the heating input should be lowered to a value which will properly maintain the cooking operation after the food has reached the desired temperature. Frequent attention by the operator is necessary to insure satisfactory heating, as failure to lower the heating input at the proper time or to a rate sufficiently reduced for continuous cooking or heating may cause scorching or burning or a less satisfactory taste, or other unsatisfactory conditions.

Many automatic temperature controls for surface heaters have been devised heretofore but have not been commercially successful for a number of reasons. Some were too complicated and expensive. Many were not sufficiently responsive to the temperature attained by the cooking vessel or were satisfactory only for certain types of surface food preparation.

It is old to use a temperature sensing element mounted in an aperture in the center of an electric heating unit which is responsive to the temperature of a cooking utensil placed upon the unit and thereby to control the heat input to the heating unit by opening and closing an electric circuit whereby the temperature of the cooking utensil and its contents are maintained at a reasonably constant cooking temperature. With a sufficiently sensitive thermostatic control adequate cooking results can be obtained in the temperature range above the boiling range, i. e. above 212° F. for frying, pressure cooking, etc. However, for those foods to be cooked by boiling or steaming, such previously known controls are ineffective in that when boiling, the temperature of the water in a utensil remains constant, i. e. 212° F. at sea level. Hence, even a slight variation in the temperature setting of the thermostat may result in the highest heat input to the electric heater remaining on continuously with resulting rapid evaporation of the water, so the food soon boils dry. Or, if set too low, the boiling temperature is never attained. It is an essential object of our invention to provide a temperature control for range surface units which provides satisfactory control of utensil temperatures which may be preselected from a low warming temperature such as 150° F. up through the boiling or steaming range and on up through desirable frying temperatures, i. e. 250°–375° F., and even into the higher temperatures required for deep fat cooking, i. e. 375°–450° F.

We accomplish this by utilizing a hydraulic type of temperature sensing element located in the center of the heating unit which actuates a remotely located bellows or diaphragm which opens and closes two separate electrical contacts at a fixed temperature differential between the two, such that upon initial heating, the heating unit is operated at maximum input until the first contact opens, which is set at the lower of the two temperatures at which time the input to the unit is reduced to a lower preselected rate to maintain the desired cooking temperature. Should the temperature of the vessel then continue to rise, the second contact opens and shuts off all heat input to the unit. Upon coooling, the second contact recloses to again supply heat to the vessel, thus maintaining the desired temperature with minimum fluctuation.

When food is to be boiled, the temperature setting of the control is such that the first set of contacts opens the maximum heating circuit at a temperature below the boiling range, i. e. approximately 200° F. and automatically reduces the heating input to a value which will continue the desired rate of boiling. Simultaneously with setting the temperatue such that the first set of contacts opens the heating circuit at a point below the boiling temperature, as explained above, the second set of contacts is set for a temperature above the boiling range, i. e. 230° F. so that if the water boils away and the temperature rises to 230° F. the second set of contacts opens and cuts off the input to avoid any tendency of the food to burn. This provides complete and effective control of all boiling and steaming operations which has not heretofore been available except with very complicated controls. The control system described is equally effective for low temperatures below boiling when the control is set for such temperatures.

The control system described above has the further advantage of providing a more flexible and satisfactory control of various surface unit cooking operations than has heretofore been devised in that cooking starts at the maximum heat input available, then is automatically reduced to a lower input as the temperature of the vessel approaches the desired temperature, thus preventing the tendency for the vessel temperature to overshoot. Further, heating input is automatically reestablished at the maximum rate should cold food be added to the vessel during the cooking operation.

It is an object of our invention to provide a practical, inexpensive form of automatic temperature control for surface heaters providing fast initial heating followed by continued heating to completion at a lower rate of heat input without requiring attention by the operator for all types of cooking performed on surface heaters.

It is an object of our invention to provide a control system which will reduce the heating input when the cooking vessel reaches a preselected temperature and thereafter continue the cooking operation at a reduced preselected heating input which is automatically varied as the temperature deviates from the preselected temperature.

It is another object of our invention to provide a control responsive to the temperature of a cooking vessel placed upon a multiple heat surface heater such that movement of a single dial or handle correlates the adjustment of the temperature and varies the heat input.

These and other objects are attained in the preferred form shown by providing a resiliently mounted liquid filled thermostatic element in the center of a surface heater. The element is provided with a hydraulic connection to a remote metal bellows or diaphragm which controls the opening and closing in succession of two electrical contacts. Both electrical contacts controlling the heating circuits are closed when the element is cold, with the result that initial heating of the cooking vessel is at the maximum power input available from the surface unit. The opening of the first of these contacts reduces the heating input to either of two or more preselected lower inputs. The subsequent opening of the second contact de-energizes the entire surface unit. As the temperature of the vessel drops, the second contact is reclosed to again bring the vessel back up to the desired cooking temperature. This alternate heating and cooling continues as long as desired.

It is an object of our invention to provide a simple hydraulic control system which will reduce the heating when the cooking vessel reaches a pre-selected temperature and continues at a reduced pre-selected heating rate which is automatically increased or decreased as the temperature deviates from the pre-selected temperature.

It is another object of our invention to provide a simple hydraulic control responsive to the temperature of a cooking vessel placed upon a multiple heat surface heater such that movement of a single dial or handle correlates the adjustment of the temperature and varies the heating rate.

These and other objects are attained in the preferred form shown by providing a resiliently mounted liquid filled thermostat bulb in the center of the surface heater. The bulb is provided with a hydraulic connection to a remote metal bellows or diaphragm which controls the opening and closing in succession of two electrical contacts. Both electrical contacts controlling the heating circuits are closed when the bulb is cold which causes initial heating of the cooking vessel at the maximum power input available from the surface unit while the subsequent opening of one of the contacts reduces the heating rate to either of two pre-selected lower rates. The opening of the second contact deenergizes the entire surface unit. As the temperature of the vessel drops the second contact is reclosed to again bring the vessel back up to the desired cooking temperature. This alternate heating and cooling continues as long as desired or until the cooking operation is completed.

A single knob and shaft has a floating cam thereon for adjusting the operating temperature of the metal bellows and the consequent operation of the aforementioned contacts. This knob and shaft also controls a second cam which selects either of two lower heating rates for continuous cooking. The floating cam has a flat portion effective from just below to just above the boiling range to make it possible to obtain either of the lower heating rates within the boiling range to provide either a fast or a slow boil.

Further objects and advantages of the present invention will be apparent from the following description, reference being had to the accompanying drawings, wherein a preferred form of the invention is clearly shown.

In the drawings:

Figure 1 is a vertical sectional view partly diagrammatic through a surface heating system provided with a control shown in the "off" position embodying one form of our invention;

Figure 2 is a view similar to Figure 1 showing the control in the "high" heating position before the preselected operating temperature is reached;

Figure 3 is a view similar to Figures 1 and 2 showing the control in the "medium" heat position after the preselected temperature has been reached;

Figure 4 is a sectional view taken along the line 4—4 of Figure 3;

Figure 5 is a sectional view taken along the line 5—5 of Figure 3;

Figure 6 is a development showing the contour of the floating cam;

Figure 7 is a development showing the contour of the inner track of the second cam;

Figure 8 is a development showing the contour of the outer track of the second cam;

Figure 9 is a simplified wiring diagram with the control in the "off" position;

Figure 10 is a simplified wiring diagram similar to Figure 9 with the control shown in the "high" heat position;

Figure 11 is a simplified wiring diagram similar to Figures 9 and 10 with the control shown in the "low" heat position;

Figure 12 is a simplified wiring diagram similar to Figures 9 to 11 with the control in the "medium" heat position.

Referring now to the drawings there is shown a power supply of the three wire single phase type having the supply conductors designated by $L_1$ and $L_2$ for the live supply conductors across which the voltage is about 235 volts and a third or neutral conductor labeled N having a voltage of 117 between it and either of the live conductors $L_1$ or $L_2$. The supply terminal $L_2$ is connected to a switch blade 20 the terminal of which protrudes from the insulated housing wall 22 of a control generally designated by the reference character 24. The switch blade 20 is in the form of a flat leaf spring having an inherent spring force tending to cause it to bow to the right or clockwise direction. It may extend alongside the control shaft 26 but as shown in Figure 5 in the preferred form it surrounds the shaft 26.

The switch blade 20 is provided with a button follower 28, a first contact 30 and a second contact 32 both located adjacent its upper end. The follower button 28 is adapted to be engaged by a rotatable floating cam 34 which is keyed or splined to the shaft 26 in a substantially frictionless mounting. The cam 34 may be moved to the left to engage the follower 28 by a small metal bellows 36 fastened to the metal base 38 by a nut 40. The metal base 38 is fastened to the housing wall 22 to complete the enclosure of the adjustable control member. The interior of the metal bellows and its mounting portion is connected by a capillary tube 42 to the interior of a thermostat bulb 44 in the form of a small flat hollow disk-shaped container located in the center of a two element electric heating unit 46. This heating unit for example may be of the type shown in the Tuttle Patents 2,456,343 issued December 14, 1948, 2,506,554 issued May 2, 1950, and 2,508,552 issued May 23, 1950. Supported on the heating unit 46 is a cooking vessel 48 which may be of any suitable type for cooking on surface heaters. The thermostat bulb 44 is resiliently urged upwardly a limited distance with a relatively light force by a small coil spring 52 extending between the bulb 44 and the support for the heating unit 46. The upward movement of the bulb 44 is limited by a stop on the capillary tube 42. A reflector and drip collecting pan 54 is mounted below the heater 46.

The heater 46 has a common terminal connecting to both elements which is connected by the conductor 56 to a floating contact 58 slidably mounted in a projection 60 of insulating material in the housing 22. The floating contact 58 is in the form of a bolt in which the head is provided with a silver tip to make it a high quality electrical contact and a light spring extends between the head and the projection so as to hold the contact in its extreme left position with a nut and lock nut against the opposite face of the projection 60. The terminal of the conductor 56 is made flexible and is held between the nut and lock nut upon the floating contact 58. The spring force of the coil spring upon the floating contact 58 is materially less than the spring force of the switch blade 20 but is sufficient to provide a contact pressure which is adequate to carry the coil required by the heater 46. The floating contact 58 cooperates with the contact 32 upon the switch blade 20. The contact 30 upon the switch blade 20 cooperates with a fixed contact 62 likewise held by the projection 60.

The above parts constitute a two step adjustable thermostatic switch means in which the temperature of the bulb 44 at which the contacts 30 and 62 separate is controlled by the thickness of the floating cam 34. The contacts 32 and 58 will separate when the temperature of the bulb 44 has risen an increment in temperature such as 15° or 20° F. above the temperature at which the contacts 30 and 62 have separated in the same angular position of the cam 34. Other types of two step contact arrangements such as shown in the Brown Patent 2,220,061, issued Nov. 5, 1940, or the Newton Patent 2,222,628, issued Nov. 26, 1940, may be used if desired.

The contact 62 is connected by the conductor 64 with the lower terminal of the solenoid 66 of a double throw double pole solenoid switch 68. The upper terminal of the solenoid 66 is connected by the conductor 70 to one terminal 72 of one of the lower stationary contacts of the switch 68 which is also connected to the neutral supply conductor N. The closing of the contacts 30 and 62 therefore connects the solenoid 66 across the supply terminals $L_2$ and N. The armature of the solenoid 66 is connected to a normally closed lower bridging contact 74 and to two upper normally open bridging contacts 76 and 78. The two inner stationary contacts cooperating with the upper bridging contacts 76 and 78 are connected to the supply terminal $L_1$. The second stationary contact cooperating with the bridging contact 76 is connected by the conductor 80 to the terminal of the element 82 of the heater 46 and also by the conductor 84 to the terminal of a switch blade 86 in the housing 22. The second stationary terminal with which the bridging contact 78 cooperates is connected by a conductor 88 to the element 90 of the heater 46 and by a second conductor 92 to the terminal of the switch blade 94 in the housing 22.

The second stationary contact with which the lower bridging contact 74 cooperates is connected by a conductor 96 connected to the terminal of a switch blade 98 which cooperates with the switch blades 86 and 94. The switch blade 98 is provided with an inherent spring force which tends to cause it to bow to the left or counterclockwise into contact with the ends of the blades 86 and 94 which are provided with silver contacts located so as to cooperate with adjacent silver contacts upon the blade 98. The blade 98, as better shown in Figure 4, surrounds the shaft 26 but if desired it may extend alongside this shaft. The blade 86 is provided with a double offset 121 to form a cam follower for the purpose of making engagement with the inner cam track 123 of the cam 125 fixed to the cam shaft 26. This inner track 123 has a contour as shown in Figure 7. The switch blade 94 is provided with a double offset 127 forming a cam follower adapted to engage the outer track 129 of the cam 125. The outer track 129 has a contour like that shown in Figure 8 so as to hold the contacts upon the switch blades 94 and 98 in contact with each other in all positions excepting the "off" position of the control knob 131 which is fastened to the front end of the shaft 26 outside the housing 22.

There is provided a light helical spring 133 surrounding the shaft 26 and extending between the second cam 125 and the floating cam 34 to keep the cam 34 in contact with the follower portion of the metal bellows 36. The housing 22 is also provided with an annular friction bearing surface 135 against which is held the front face of the cam 125. This holding action is accomplished by providing a light coil spring 137 surrounding the shaft 26 extending between a washer 139 upon the shaft and the front face of the housing 22. The shaft 26 is rotatably mounted in the front and rear bearings provided in the housing 22 and the base plate 38. The contour of the cam 34 provides a high projection 140 correlated with the "off" position of the knob 131 and the low portions 141 and 143 of the contours of the cam tracks 123 and 129 shown in Figures 7 and 8. The contour of the cam 34 gradually inclines downward as indicated by the reference character 145 from the "off" position to an intermediate radially flat portion 147 located to provide an opening or separation of the contacts 30 and 62 at a temperature of the cooking vessel 48 and the thermostat bulb 44 of approximately 205° F. Coordinated and aligned with the middle of this flat portion 147 is an inclined portion 149 upon the cam 123 which connects directly with the low portion 151 thereof which is coordinated with the higher temperature portion of the cam 34. The second end of the flat portion 147 connects with an upwardly inclined portion 153 extending to higher surface heat temperatures.

The contour of the cam 34 determines the temperatures at which the contacts 30 and 62 and 32 and 58 open and close. The scale at the side of Figure 6 indicates approximately the temperature of the bulb 44 and the cooking vessel 48 at which the contacts 30 and 62 open and close. The contacts 32 and 58 are arranged so that they will open at about 15° to 25° higher than the contacts 30 and 62. This is done by making the distance between the contact head and the nuts of the contact 58 sufficiently far apart to cause the head to project beyond the contact 62 a sufficient distance to cause the contact 32 to be disengaged at temperatures about 15° to 25° higher than the temperatures at which the contact 30 is disengaged. The cam 125 merely serves to disconnect the one terminal of the element 82 from the neutral supply conductor and from the solenoid 66 and the switch contact 62. It is evident that this switch blade 86 and its operating cam surface could be omitted if not required for considerations of shock hazard and the underwriter's code.

In operation, the cooking vessel 48 properly filled is first placed upon the heating unit 46 making contact with the thermostat bulb 44 which is thereby depressed. The knob 131 is rotated to any one of its positions which are designated from 0 to 550. The boiling range is designated slow boil and fast boil. The cams 34 and 125 rotate with the knob 131. If the knob 131 is set to the fast boiling position or to any higher temperatured position the contacts 32 and 58, the contacts 30 and 62, the contacts 94 and 98 as well as the contacts 86 and 98 are all closed by the presentation of appropriate portions of the surfaces of the cams 34 and 125 as illustrated in Figures 6 to 8 and 10. The closing of the contacts 30 and 62 energizes the solenoid 66 to move the bridging contact 74 to the open position and the bridging contacts 76 and 78 to their closed positions. This connects both heating elements 82 and 90 across the supply conductors $L_1$ and $L_2$ at 235 volts to provide a maximum heating rate which for example may be 800 watts each. The bellows 36 is collapsed at this time so as to cause the spring 133 to move the cam 34 away from the follower button 28 and the switch blade 20. The contacts remain in the aforementioned positions until the temperature of the cooking vessel 48 rises to the temperature selected by the position of the dial 131.

At this point the bellows 36 will have been expanded sufficiently by the expansion of the hydraulic liquid in the bulb 44 to separate the contacts 30 and 62 to deenergize the solenoid 66. This causes the relay contacts 76 and 78 to move to the open position and the bridging contact 74 to move to the closed position connecting the neutral supply conductor through the switch blades 98 and 86 and the conductors 84 and 80 with the heating element 82 and also connecting to the blade 94, the conductors 92 and 88 to the heating element 90. The common terminal of the heating elements 82 and 90 is connected by the conductor 56, and contacts 32 and 58 and the switch blade 20 with the supply conductor $L_2$. This reduces the heating rate to one-quarter the maximum rate or 200 watts for each element 82 and 90 for a total of 400 watts. This heating rate is suitable for finishing deep fat frying, sauteing, frying and making of boiled icing. This heating rate is sufficient to keep water at a rolling or fast boiling condition.

When the dial knob 131 is turned to the slow boil position or a lower temperatured position as illustrated in dot and dash lines in Figures 6 to 8, the warm-up or initial step is the same excepting that the switch blade 94 remains in the open position as indicated by the high portion 141 of the contour of the cam 143. The contacts 32 and 58 as well as 30 and 62 are closed and remain closed energizing the solenoid 66 until the selected temperature is reached. Because of this, the upper contacts 76 and 78 are closed and the lower contact is opened to energize both elements 82 and 90 at the high voltage of 235 volts until the selected temperature is reached.

When the selected temperature is reached, the contacts 30 and 62 will separate to denergize the solenoid 66 and open the upper bridging contacts 76 and 78. The lower contact 74 closes to energize the heating element 82 from the neutral conductor through the bridging contact 74 through the conductors 96, the switch blade 98, the switch blade 86, the conductors 84 and 80 to the one terminal of the heating element 82. The common terminal of the heater 46 is connected by the conductor 56, the contacts 58 and 32 and the switch blade 20 to the supply conductor $L_2$. This connects the heating element 82 alone across the terminals $L_2$ and N at 117 volts to provide a maximum heating rate of 200 watts. This heating rate is suitable for finishing cooking vegetables, making candy, cream sauces and custards, stewing and warming foods. This heating rate provides slightly more heat than is required to maintain water just at boiling for maintaining slow boiling.

In the event that either the 200 watt low heat or the 400 watt medium heat are more than sufficient to maintain the temperature selected, the rise in temperature of the cooking vessel 48 will cause further expansion of the hydraulic liquid in the thermostat bulb 44 which will be transmitted through the capillary tube 42 into the bellows 36. The additional expansion of the bellows 36 will move the cam 34, the follower button 28 and the switch blade 20 to the left to separate the contacts 32 and 58 thus deenergizing the heater 46 until the temperature of the cooking vessel 48 falls sufficiently to reclose the contacts 32 and 58. This is particularly valuable in preventing burning of foods if they are permitted to boil dry since the temperature of the vessel 48 cannot rise more than 15° to 25° above the selected temperature. This action will be the same whether both elements or only one element of the heater 46 is energized.

If the 200 or 400 watt heat is insufficient to maintain the cooking vessel 48 at the selected temperature the bellows 36 will contract allowing the cam 34, the follower 28 and the switch blade 20 to move farther to the right closing the contacts 30 and 62 to energize the solenoid 66 to close the bridging contacts 76 and 78 and open the lower bridging contact 74. This will revert the heating circuit to its starting condition energizing both heating elements at 800 watts on 235 volts. This heating will continue until the temperature of the cooking vessel is restored.

Because water does not rise in temperature during boiling and because the boiling temperature falls below 212° F. as the altitude increases, in the slow and fast boiling range, the cam 34 presents a flat portion of its contour between the bellows 36 and the follower button 48 of such thickness to cause the contacts 30 and 62 to be opened when the temperature of the bulb 44 reaches about 205° F. When this temperature is reached, the relay solenoid is deenergized to reduce the heating rate from 1600 watts to either 200 or 400 watts. Even the low heating rate of 200 watts is sufficient alone to raise the water to boiling and to keep the water at a slow boil. The stored heat in the heating unit 46 makes rapid the rise from 205° F. to boiling upon either the 200 or 400 watt rate.

According to the provisions of Rule 78a, reference is made to the following prior filed applications: S. N. 396,210 filed Dec. 4, 1953, now abandoned; and S. N. 354,952 filed May 14, 1953.

While the form of embodiment of the invention as herein disclosed constitutes a preferred form, it is to be understood that other forms might be adopted, as may come within the scope of the claims which follow.

What is claimed is as follows:

1. An electrical system for heating receptacles on the upper part of a range including an electrical surface heating means, a two voltage power source, a resiliently mounted contact element associated with said surface heating means for contacting a receptacle on the surface heating means, an adjustable thermostatic two step switch means responsive to the temperature of said contact element and adjustable to selected temperature ranges and having an increment in temperature between the opening of its first and second switch means in the two steps, a double throw relay for alternately connecting said heating means to either said high or low voltage of said power source, means controlled by said first switch means for moving said relay to said high voltage position below a selected temperature and for moving the relay to connect the heating means to the low voltage connection of the power source above the selected temperature, and means controlled by said second switch means for deenergizing said heating means, said two step switch means being provided with an adjustable thermal actuating system adapted to be responsive to the temperature of the receptacle on the heating means.

2. An electrical system for heating receptacles on the upper part of a range including an electrical surface heating means, a two voltage power source, a resiliently mounted contact element associated with said surface heating means for contacting a receptacle on the surface heating means, an adjustable thermostatic two step switch means responsive to the temperature of said contact element and adjustable to selected temperature ranges and having an increment in temperature between the opening of its first and second switch means in the two steps, a double throw relay for alternately connecting said heating means to either said high or low voltage of said power source, means controlled by said first switch means for moving said relay to said high voltage position below a selected temperature and for moving the relay to connect the heating means to the low voltage connection of the power source above the selected temperature, and means controlled by said second switch means for deenergizing said heating means, said two step switch means being provided with an adjustable thermal actuating system adapted to be responsive to the temperature of the receptacle on the heating means, the adjustment means of said adjustable thermal actuating system being provided with means for deenergizing a portion of said heating means in a lower portion of its range of adjustment.

3. An electrical system for heating receptacles on the upper part of a range including an electrical surface heating means, a two voltage power source, a two step thermostatic switch means having an increment in temperature between the opening of its first and second switch means in the two steps, said switch means being provided with a thermal actuating system responsive to the temperature of a receptacle on the heating means, a double throw relay controlled by said first switch means for alternately connecting said heating means to either said high or low voltage of said power source, an adjustable cam means cooperating with said switch means for selecting the switch operating temperatures, said cam means having a substantially constant temperature dwell portion providing a switch operating temperature in the vicinity of water boiling temperatures, a third switch means interconnected with the low voltage connection of said relay for providing a plurality of low voltage heating rates of said heating means, and a common interconnected manual operating means for said cam means and said third switch means coordinated to move said third switch means to one position in the range of operation of a part of said dwell portion and a second portion of said cam means and to move said third switch means to another position in the range of operation of another part of said dwell portion and a third portion of said cam means.

4. An electrical system for heating receptacles on the upper part of a range including an electrical surface heating means, a two voltage power source, a two step thermostatic switch means having an increment in temperature between the opening of its first and second switch means in the two steps, said switch means being provided with a thermal actuating system responsive to the temperature of a receptacle on the heating means, a double throw relay controlled by said first switch means for alternately connecting said heating means to either said high or low voltage of said power source, an adjustable cam means cooperating with said switch means for selecting the switch operating temperatures, said cam means having a substantially constant temperature dwell portion providing a switch operating temperature in the vicinity of water boiling temperatures, a third switch means interconnected with the low voltage connection of said relay for providing a plurality of low voltage heating rates of said heating means, and a common interconnected manual operating means for said cam means and said third switch means coordinated to move said third switch means to one position in the range of operation of a part of said dwell portion and a second portion of said cam means and to move said third switch means to another position in the range of operation of another part of said dwell portion and a third portion of said cam means, and means controlled by said second switch means for deenergizing said heating means.

5. An electrical system for heating receptacles on the top of a support including an electric surface heating means having connected sections and terminals at the ends of the sections, power supply conductors, a resiliently mounted contact element associated with said surface heating means for contacting a receptacle on the surface heating means, a two step thermostat substantially responsive to the temperature of said contact element, said thermostat having first and second step switches and an increment in temperature between the operation of its first step switch and its second step switch, said first step switch having means for controlling the connection between one of said terminals and said supply conductors to provide a high energy output above and a lower energy output below its operating temperature, a third switch for changing the connection between one of said terminals and one of the supply conductors having lower and higher output positions for providing two different lower energy output rates, said second step switch having means for controlling the connection between a second terminal and said supply conductors to provide a still lower energy output, and common coordinating means having a single coordinating manipulating device with means for operating said third switch to said lower and higher output positions for changing said first mentioned lower energy output in coordination with means for coincidentally changing the operating temperatures of said first and second step switches.

6. An electrical system for heating receptacles on the top of a support including an electric surface heating means having connected sections and terminals at the ends of the sections, power supply conductors, a resiliently mounted contact element associated with said surface heating means for contacting a receptacle on the surface heating means, a two step thermostat substantially responsive to the temperature of said contact element, said thermostat having first and second step switches and an increment in temperature between the operation of its first step switch and its second step switch, said first step switch having means for controlling the connection between one of said terminals and said supply conductors to provide a high energy output above and a lower energy output below its operating temperature, a third switch for changing the connection between one of said terminals and one of the supply conductors having lower and higher output positions for providing two different lower energy output rates, said second step switch having means for controlling the connection between a second terminal and said supply conductors to provide a still lower energy output, and common coordinating means having a single coordinating manipulating device with adjusting means for coincidentally adjusting the operating temperatures of said first and second step thermostats throughout temperature zones above and below water boiling temperatures in coordination with means for moving said third switch to its lower output position when said adjusting means is in positions to adjust said operating temperatures below water boiling temperatures and for moving said third switch to its higher output position when said adjusting means is in positions to adjust said operating temperatures above water boiling temperatures.

References Cited in the file of this patent
UNITED STATES PATENTS

| 2,403,824 | Newell | July 9, 1946 |
| 2,404,139 | McCormick | July 16, 1946 |
| 2,409,414 | Bletz | Oct. 15, 1946 |
| 2,434,467 | McCormick | Jan. 13, 1948 |
| 2,549,461 | Haller | Apr. 17, 1951 |
| 2,614,199 | Fallon | Oct. 14, 1952 |
| 2,675,455 | Richardson | Apr. 13, 1954 |
| 2,685,636 | Vogelsberg | Aug. 3, 1954 |
| 2,767,293 | Jordan | Oct. 16, 1956 |
| 2,790,057 | Schaver | Apr. 23, 1957 |